United States Patent
Taguchi

(10) Patent No.: US 6,764,540 B2
(45) Date of Patent: Jul. 20, 2004

(54) INK COMPOSITIONS AND INK JET RECORDING METHOD

(75) Inventor: Toshiki Taguchi, Kanagawa (JP)

(73) Assignee: Fuji Photo Film Co., Ltd., Ashigara (JP)

( * ) Notice: Subject to any disclaimer, the term of this patent is extended or adjusted under 35 U.S.C. 154(b) by 0 days.

(21) Appl. No.: 10/231,164

(22) Filed: Aug. 30, 2002

(65) Prior Publication Data

US 2003/0061965 A1 Apr. 3, 2003

(30) Foreign Application Priority Data

Sep. 3, 2001 (JP) .................................... P.2001-266015

(51) Int. Cl.$^7$ ......................... C09D 11/00; C09D 11/02
(52) U.S. Cl. ............................. 106/31.27; 106/31.36; 427/466; 428/195
(58) Field of Search .................. 106/31.27, 31.36; 427/466; 428/195

(56) References Cited

U.S. PATENT DOCUMENTS

| | | | |
|---|---|---|---|
| 5,108,505 A | * | 4/1992 | Moffatt .................... 106/31.36 |
| 5,302,195 A | * | 4/1994 | Helbrecht et al. ....... 106/31.36 |
| 5,626,655 A | | 5/1997 | Pawlowski et al. |
| 5,837,043 A | | 11/1998 | Wong et al. |
| 6,017,471 A | * | 1/2000 | MacDonald et al. ........ 252/600 |
| 6,090,193 A | * | 7/2000 | Nigam et al. ............. 106/31.27 |
| 6,099,628 A | * | 8/2000 | Nohr et al. ............... 106/31.49 |
| 6,168,654 B1 | * | 1/2001 | Nohr et al. ............... 106/31.49 |
| 6,235,095 B1 | * | 5/2001 | Nohr et al. ............... 106/31.32 |
| 6,368,396 B1 | * | 4/2002 | Nohr et al. ............... 106/31.49 |
| 6,524,379 B2 | * | 2/2003 | Nohr et al. ............... 106/31.49 |
| 2002/0134280 A1 | * | 9/2002 | Naruse .................... 106/31.27 |
| 2002/0149656 A1 | * | 10/2002 | Nohr et al. ................... 347/95 |
| 2003/0021983 A1 | * | 1/2003 | Nohr et al. ................. 428/327 |

FOREIGN PATENT DOCUMENTS

| | | |
|---|---|---|
| JP | 58-74761 | 5/1983 |
| JP | 60-92369 | 5/1985 |
| JP | 6-88048 | 3/1994 |
| JP | 8-333532 | 12/1996 |
| JP | 8-333533 | 12/1996 |
| JP | 2000-265098 | 9/2000 |

* cited by examiner

Primary Examiner—Mark L. Bell
Assistant Examiner—Veronica F. Faison
(74) Attorney, Agent, or Firm—Burns, Doane, Swecker & Mathis, L.L.P.

(57) ABSTRACT

An ink composition comprising water, a dye and at least one compound capable of including a dye therein, wherein the dye is dissolved or dispersed in an aqueous medium comprising the water.

11 Claims, No Drawings

INK COMPOSITIONS AND INK JET RECORDING METHOD

FIELD OF THE INVENTION

This invention relates to ink compositions whereby images with high qualities and high storage stability can be obtained. In particular, it relates to ink compositions favorably used in ink jet recording and an ink jet recording method with the use of the ink compositions.

BACKGROUND OF THE INVENTION

With the recent popularization of computers, ink jet printers have been widely used in printing on papers, films, fabrics, etc. not only for business purposes but also for household purposes.

There are a number of ink jet recording systems, for example, a system wherein liquid drops are jetted under the application of pressure by a piezoelectric device, a system wherein liquid drops are jetted by using ink bubbles formed by heating, a system with the use of ultrasonic wave, and a system wherein liquid drops are electrostatically sucked and jetted. As inks for these ink jet recording systems, use has been made of water inks, oily inks and solid (melting) inks. Among these inks, water inks have been mainly employed because of being favorable from the viewpoints of easiness in production and handling, smell, safety, etc.

It is required that colorants to be used in these inks for ink jet recording are highly soluble in solvents, enable high-density recording, have favorable color hues, are highly fast to light, heat, air, water and chemicals, have excellent fixation properties to image recording materials with little bleeding, excellent storage properties as inks, no toxicity and high purity, and can be economically obtained. However, colorants satisfying all of these requirements at high levels can be hardly found out.

Although there have been proposed various dyes and pigments for ink jet recording and already put into practical use, no colorant satisfying all of these requirements has been established so far. By using commonly known dyes or pigments with color index (C.I.) numbers, both of the color hues and fastness needed in ink recording inks can be hardly achieved.

On the other hand, Japanese Patent Laid-Open No. 74761/1983 and ibid. No. 92369/1985 disclose inks containing glycerol and ethylene oxide adducts of diethylene glycol and alcohols, and Japanese Patent Laid-Open No. 2000-265098 proposes to use ethylene oxide adducts of long chain linear alcohols. However, these inks suffer from a disadvantage that image qualities of images formed thereby are worsened during storage.

Furthermore, Japanese Patent Laid-Open 88048/1994, ibid. No. 333532/1996, ibid. No. 333533/1996, U.S. Pat. No. 5,837,043, ibid. U.S. Pat. No. 5,626,655, etc. propose that bleeding in images can be relieved by using inks containing ethylene oxide adducts of higher alcohols. However, these inks have other disadvantages such as frequently causing plugging and suffering from changes in color tones due to poor image storing properties.

SUMMARY OF THE INVENTION

The present invention provides ink compositions having a high jetting stability, being excellent color hue, weatherability and moisture resistance and showing favorable image qualities and an ink jet recording method with the use of the compositions.

The object of the present invention can be achieved by ink compositions and an ink jet recording method as will be specified by the following five items.

1) An ink composition made up of a dye dissolved or dispersed in an aqueous medium characterized in that the ink composition contains water, a water-miscible organic solvent, a dye and at least one compound capable of including a dye therein.

2) An ink composition according to the above 1) characterized in that the above-described compound capable of including a dye therein is a rotaxane molecule or a molecular nanotube.

3) An ink composition according to claim the above 1) or 2) characterized in that each of the compound capable of including a dye therein, rotaxane molecule and molecular nanotube has cyclodextrin as the constitutional unit.

4) An ink composition according to any of the above 1) to 3) characterized in that the ink composition is to be used in ink jet recording.

5) An ink jet recording method comprising jetting ink drops onto an image recording (receiving) material having an image recording layer containing inorganic pigment particles on a substrate in accordance with recording signals and thus recording an image on the image recording material, characterized in that the ink drops are made of an ink composition according to any of the above 1) to 4).

DETAILED DESCRIPTION OF THE INVENTION

The present invention will be described in greater detail.

The ink composition according to the present invention, which is made up of an aqueous medium composed of water and a water-miscible organic solvent and a dye such as a water-soluble dye or oil-soluble dye dissolved or dispersed in the aqueous medium, contains at least one "compound capable of including a dye" (hereinafter referred to as an inclusion compound) together with the dye. Images (involving characters and diagrams) recorded by using the ink composition according to the present invention have excellent weatherability, which makes it favorable as an ink composition for ink jet recording.

In the present invention, an inclusion compound is defined as a compound which is capable of incorporating a dye molecule in its structure. The term "inclusion compound" means a compound which forms an inclusion lattice in case where two types of molecules are combined together under adequate conditions and one of these molecules forms a tunnel, layered or network structure (i.e., the inclusion lattice) while the other molecule is incorporated within the space (Iwanami Rikagakujiten, 5th ed., p. 1296 (1998)).

It is assumed that the inclusion compound contained in the ink composition according to the present invention has an effect of incorporating (including) the whole water-soluble or oil-soluble dye molecules or a part thereof contained (included) in the ink composition.

As the above-described inclusion compound, use can be made of rotaxanes, molecular nanotubes, crown compounds (18-crown-6, 15-crown-5, dibenzo-14-crown-4, dicyclohexyl-18-crown-6, cryptand[2.2.2], etc.), cyclodextrins (α-cyclodextrin, β-cyclodextrin, γ-cyclodextrin, etc.), cyclophane, azacyclophane, calixarenes (calix[4]arene, calix[6]arene, calix[8]arene, etc.), cyclotriveratrylene, cavitand, oligopeptide, deoxycholic acid, perhydrotriphenylene, tri-O-thymotide, cyclophosphazene and so on.

In addition to the compounds as cited above, it is also possible to use compounds reported by Fumio Tokuni (Hosetsu Kagobutsu no Kiso to Oyo, NTS (1989)) and Naoya Ogata (Kinousei Chobunshi no Sekkei to Shorai Tenbo, CMC (1998)).

Particularly preferable examples of the inclusion compound to be used in the present invention are rotaxanes, molecular nanotubes, crown ethers, cyclodextrin, azacrown compounds and calixarenes.

In the present invention, it is particularly preferable to use rotaxane molecules and molecular nanotubes which are inclusion compounds having cyclodextrins bonded to each other in tandem (i.e., having cyclodextrin as a constitutional unit) and capable of including a dye therein.

Molecular nanotubes, which are publicly known compounds, are described in detail in Science (1994), 264 (5156), 249–251; J. Phys. Chem. (1996), 100(38), 15562–15568; Kobunshi Ronbunshu (1999), 56(12), 8330836; J. Chem. Phys. (2000), 112(9), 4321–4325;Langmuir (2000), 16(26), 10278–10280; J. Chem. Phys. (2001), 114(1), 1–3; etc.

As the constitutional unit of the molecular nanotubes, use can be made of various compounds such as α-cyclodextrin, β-cyclodextrin and γ-cyclodextrin.

The ink composition according to the present invention contains at least one "compound capable of including a dye therein". It is preferable that the content of such a compound ranges from 0.1 to 60% by weight, still preferably from 1 to 40% by weight, in 100% by weight of the ink composition.

The ink composition according to the present invention can be produced by dissolving and/or dispersing a dye in an aqueous medium. As the dye, use can be made of various dyes such as azo dyes, azomethin dyes, cyanine dyes, merocyanine dyes, oxonol dyes, quinone dyes and indigo dyes. From the viewpoint of the interaction (inclusion) between the dye and the compound capable of including a dye therein, it is favorable to use azo pigments.

To obtain full-color images or to control the color tone, it is also possible to use other colorants or dyes together.

An aqueous medium is used in the ink composition. The term "aqueous medium" means a water or a mixture of water with a small amount of a water-miscible (water-soluble) organic solvent optionally containing additives such as a wetting agent, a stabilizer and a preservative. Furthermore, a surfactant can be used in this system.

Examples of the above-described water-miscible organic solvent usable in the present invention include alcohols (for example, methanol, ethanol, propanol, isopropanol, butanol, isobutanol, sec-butanol, t-butanol, pentanol, hexanol, cyclohdxanol, benzyl alcohol), polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerol, hexanetriol, thiodiglycol), glycol derivatives (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, trimethylene glycol monoethyl ether, ethylene glycol monophenyl ether), amines (for example, ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, tetramethylpropylenediamine) and other polar solvents (for example, formamide, N,N-dimethylformamide, N,N-dimethylacetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, acetone). A mixture of two or more water-miscible organic solvents as cited above may be used.

In case where the above-described dye is an oil-soluble dye, the ink composition can be prepared by dissolving the oil-soluble dye in a high-boiling organic solvent and emulsified/dispersed in an aqueous medium.

The high-boiling organic solvent to be used in the present invention has a boiling point of 150° C. or higher, preferably 170° C. or higher.

Examples thereof include phthalic acid esters (for example, dibutyl phthalate, dioctyl phthalate, dicyclohexyl phthalate, di-2-ethylhexyl phthalate, decyl phthalate, bis(2, 4-di-tert-amylphenyl) isophthalate, bis(1,1-diethylpropyl) phthalate), phosphoric acid or phosphonic acid esters (for example, diphenyl phosphate triphenyl phosphate, tricresyl phosphate, 2-ethylhexyldiphenyl phosphate, dioctylbutyl phosphate, tricyclohexyl phosphate, tri-2-ethylhexyl phosphate, tridodecyl phosphate, di-2-ethyhexylphenyl phosphate), benzoic acid esters (for example, 2-ethylhexyl benzoate, 2,4-dichloro benzoate, dodecyl benzoate, 2-ethylhexyl-p-hydroxy benzoate), amides (for example, N,N-diethyldeane amide, N,N-diethyllauryl amide), alcohols and phenols (for example, isostearyl alcohol, 2,4,-di-tert-amyl phenol), aliphatic esters (for example, dibutoxyethyl succinate, di-2-ethylhexyl succinate, 2-hexyldecyl tetradecanoate, tributyl citrate, diethyl azelate, isostearyl lactate, trioctyl citrate), aniline derivatives (for example, N,N-dibutyl-2-butoxy-5-tert-octyl aniline), chlorinated paraffins (for example, paraffins having a chlorine content of 10% to 80%), trimesic acid esters (for example, tributyl trimesate), dodecylbenzene, diisopropylnaphthalene, phenols (for example, 2,4-di-tert-amylphenol, 4-dodecyloxyphenol, 4-dodecyloxycarbonylphenol, 4-(4-dodecyloxyphenylsulfonyl) phenol), carboxylic acids (for example, 2-(2,4-di-tert-amylphenoxybutyric acid, 2-ethoxyoctanedecanoic acid), and alkylphosphoric acids (for example, di-2(ethylhexyl) phosphoric acid, diphenylphosphoric acid). The high-boiling organic solvent can be used in an amount 0.01 to 3 times by weight, preferably 0.01 to 1.0 times, as much as the oil-soluble dye.

Either one of these high-boiling organic solvent or a mixture of two or more thereof (for example, tricresyl phosphate with dibutyl phthalate, trioctyl phosphate with di(2-ethylhexyl)cebacate, dibutyl phthalate with poly(N-t-butylacrylamide)) may be used.

Examples of the high-boiling organic solvent to be used in the present invention other than those cited above and/or methods of synthesizing these high-boiling organic solvents are described in, for example, U.S. Pat. No. 2,322,027, ibid. U.S. Pat. No. 2,533,514, ibid. U.S. Pat. No. 2,772,163, ibid. U.S. Pat. No. 2,835,579, ibid. U.S. Pat. No. 3,594,171, ibid. U.S. Pat. No. 3,676,137, ibid. U.S. Pat. No. 3,689,271, ibid. U.S. Pat. No. 3,700,454, ibid. U.S. Pat. No. 3,748,141, ibid. U.S. Pat. No. 3,764,336, ibid. U.S. Pat. No. 3,765,897, ibid. U.S. Pat. No. 3,912,515, ibid. U.S. Pat. No. 3,936,303, ibid. U.S. Pat. No. 4,004,928, ibid. U.S. Pat. No. 4,080,209, ibid. U.S. Pat. No. 4,127,413, ibid. U.S. Pat. No. 4,193,802, ibid. U.S. Pat. No. 4,207,393, ibid. U.S. Pat. No. 4,220,711, ibid. U.S. Pat. No. 4,239,851, ibid. U.S. Pat. No. 4,278,757, ibid.

U.S. Pat. No. 4,353,979, ibid. U.S. Pat. No. 4,363,873, ibid. U.S. Pat. No. 4,430,421, ibid. U.S. Pat. No. 4,430,422, ibid. U.S. Pat. No. 4,464,464, ibid. U.S. Pat. No. 4,483,918, ibid. U.S. Pat. No. 4,540,657, ibid. U.S. Pat. No. 4,684,606, ibid. U.S. Pat. No. 4,728,599, ibid. U.S. Pat. No. 4,745,049, ibid. U.S. Pat. No. 4,935,321, ibid. U.S. Pat. No. 5,013,639, EP276,319A, ibid. 286,253A, ibid. 289,820A, ibid. 309, 158A, ibid. 309,159A, ibid. 309,160A, ibid. 509,311A, ibid. 510,576A, East Germany Patent No. 147,009, ibid. No. 157,147, ibid. No. 159,573, ibid. No. 225,240A, U.K. Patent No. 2,091,124A, Japanese Patent Laid-Open No. 47335/1973, ibid. No. 26530/1975, ibid. No. 25133/1976, ibid. No. 26036/1976, ibid. No. 27921/1976, ibid. No. 27922/1976, ibid. No. 149028/1976, ibid. No. 46816/1977, ibid. No. 1520/1978, ibid. No. 1521/1978, ibid. No. 15127/1978, ibid. No. 146622/1978, ibid. No. 91325/1979, ibid. No. 106228/1979, ibid. No. 118246/1979, ibid. No. 59464/1980, ibid. No. 64333/1980, ibid. No. 81836/1981, ibid. No. 204041/1984, ibid. No. 84641/1986, ibid. No. 118345/1987, ibid. No. 247364/1987, ibid. No. 167357/1988, ibid. No. 214744/1988, ibid. No. 301941/1988, ibid. No. 9452/1989, ibid. No. 9454/1989, ibid. No. 68745/1989, ibid. No. 101543/1989, ibid. No. 102454/1989, ibid. No. 792/1990, ibid. No. 4239/1990, ibid. No. 43541/1990, ibid. No. 29237/1992, ibid. No. 30165/1992, ibid. No. 232946/1992 and ibid. No. 346338/1992.

The high-boiling organic solvent described above is used in an amount 0.01 to 3.0 times by weight, preferably 0.01 to 1.0 times, as much as the oil-soluble dye.

In the present invention, the oil-soluble dye and the high-boiling organic solvent are used in the state of being emulsified/dispersed in the aqueous medium. From the viewpoint of emulsification, use can be also made of a low-boiling organic solvent in the step of the emulsification/dispersion. The term "low-boiling organic solvent" means an organic solvent having a boiling point of 30° C. or higher but not higher than 150° C. under atmospheric pressure. Preferable examples thereof include esters (for example, ethyl acetate, butyl acetate, ethyl propionate, β-ethoxyethyl acetate, methylcellosolve acetate), alcohols (for example, isopropyl alcohol, n-butyl alcohol, secondary butyl alcohol), ketones (for example, methyl isobutyl ketone, methyl ethyl ketone, cyclohexanone), amides (for example, dimethylformamide, N-methylpyrrolidone) and ethers (for example, tetrahydrofuran, dioxane), though the present invention is not restricted thereto.

The emulsification/dispersion can be carried out by dispersing an oily phase, in which the dye has been dissolved in the high-boiling organic solvent optionally mixed with the low-boiling organic solvent, in an aqueous phase containing water as the major component and thus forming microdrops of the oily layer. In this step, it is possible to add additives such as a wetting agent, a dye stabilizer, an emulsion stabilizer, a preservative and a mildew-proofing agent as will be described hereinafter either one or both of the aqueous phase and the oily phase.

For the emulsification, it has been a common practice to add the oily phase to the aqueous phase. It is also favorable to use the so-called phase inversion emulsification method wherein the aqueous phase is dropped into the oily phase.

In the emulsification/dispersion in the present invention, use can be made of various surfactants. For example, it is preferable to use anionic surfactants such as fatty acid salts, alkyl sulfates, alkyl benzenesulfonates, alkyl naphthalenesulfonates, dialkyl sulcosuccinates, alkyl phosphates, napthalenesulfonic acid-formalin condensate or polyoxyethylene alkyl sulfates, or nonionic surfactants such as polyoxyethylene alkyl ethers, polyoxyethylene alkyl allyl ethers, polyoxyethylene fatty acid esters, sorbitan fatty acid esters, polyoxyethylene sorbitan fatty acid esters, polyoxyethylene alkylamines, glycerol fatty acid esters and oxyethylene-oxypropylene block copolymer. Also, SURFYNOLS (manufactured by Air Products & Chemicals) which are acetylene-based polyoxyethylene oxide surfactants can be preferably employed. It is also preferable to use amphoteric surfactants such as N,N-dimethyl-N-alkylamine oxides. Furthermore, use can be made of surfactants cited in Japanese Patent Laid-Open No. 157,636/1984, pp. (37) to (38) and Research Disclosure NO. 308119 (1989).

To stabilize the dispersion immediately after the emulsification, a water-soluble polymer may be added together with the above-described surfactant. As the water-soluble polymer, it is preferable to use polyvinyl alcohol, polyvinylpyrrolidone, polyethylene oxide, polyacrylic acid, polyacrylamide and copolymers thereof. It is also preferable to use natural water-soluble polymers such as polysaccharides, casein and gelatin. To further stabilize the dye dispersion, it is also possible to use polyvinyls, polyurethanes, polyesters, polyamides, polyuretahens, polycarbonates, etc. which are obtained by polymerizing acrylic acid esters, methacrylic acid esters, vinyl esters, acrylamides, methacrylamides, olefins, styrenes, vinyl ethers and acrylonitriles and are substantially insoluble in the aqueous medium. It is preferable that these polymers contain —$SO^{2-}$ or —$COO^-$. In case of using such a polymer substantially insoluble in the aqueous medium, it is preferable to use the polymer in an amount of not more than 20% by weight, still preferably not more than 10% by weight, based on the high-boiling organic solvent.

In case of dispersing the oil-soluble dye and the high-boiling organic solvent by emulsification/dispersion to prepare a water ink, it is specifically important to control the particle size. To enhance the color purity and density in forming an image by ink jet recording, it is essentially required to lessen the average particle size. It is preferable that the volume-average particle size is 1 μm or less, still preferably from 5 to 100 nm.

The volume-average particle size of the dispersed particles as described above and the particle size distribution can be easily measured by using a publicly known method, for example, the static light scattering method, the dynamic light scattering method, the centrifugation method or the methods cited in Jikken Kagaku Koza, Eth ed., pp. 417 to 418. For example, the ink is diluted with distilled water to give a particle concentration in the ink of 0.1 to 1% by weight. Then, measurement can be easily made by using a marketed volume-average particle size measuring apparatus, for example, MICROTRACK UPA (manufactured by Nikkiso). It is particularly preferable to use the dynamic light scattering method by taking advantage of the laser Doppler effect, since even a very small particle size can be measured thereby.

The term "volume-average particle size" means the average particle size weighed with particle diameter. It is calculated by dividing the grand total of the products of the particle size by the volume of individual particles by the total volume of the particles. Volume-average particle diameter is described in "Kobunshi Ratekkusu no Kagaku", Soichi Muroi, Kobunshi Kanko-kai, p. 119.

It has been also clarified that the existence of coarse particles largely affects the printing performance. Namely, coarse particles cause plugging in head nozzles or staining, though not plugging. As a result, there arise jetting errors or twisting, thereby seriously affecting the printing performance. To prevent these phenomena, it is important to regulate the concentrations of particles of 5 µm or more in size and particles 1 µm or more in size respectively to 10 or less and 1000 or less per µl of ink.

To eliminate these coarse particles, use can be made of a publicly known method such as centrifugation or microfiltration. Such a separating procedure may be carried out either immediately after the emulsification/dispersion or after adding various additives such as a wetting agent and a surfactant to the emulsified dispersion immediately before packing in an ink cartridge.

As effective means of lessening the average particle size and eliminating coarse particles, a mechanical emulsifying apparatus can be employed.

As an emulsifying apparatus, use can be made of a publicly known apparatus, for example, a simple stirrer, an impeller stirrer system, an inline stirrer system, a mill such as a colloid mill or an ultrasonic system. It is particularly preferable to use a high pressure homogenizer.

Detailed mechanism of the high pressure homogenizer is described in U.S. Pat. No. 4,533,254, Japanese Patent Laid-Open No. 47264/1994, etc. As marketed apparatus, there are known Gaulin Homogenizer (manufactured by A.P.V. GAULIN INC.), Microfluidizer (manufactured by MICROFLUIDEX INC.), Altimizer (manufactured by K.K. Sugino Machine), etc.

Moreover, a high pressure homogenizer provided with a mechanism of forming microparticles in an ultrahigh pressure jet stream, which is recently proposed by U.S. Pat. No. 5,720,551, is particularly effective in the emulsification/dispersion in the present invention. As an example of this emulsifying apparatus with the use of an ultrahigh pressure jet stream, DEBEE2000 (manufactured by BEE INTERNATIONAL LTD.) may be cited.

The pressure employed in the emulsification with the high pressure emulsifying/dispersing apparatus is 50 MPa or above, preferably 60 MPa or above and still preferably 180 MPa or above.

It is particularly preferable to use two or more types of emulsifying apparatuses in combination as, for example, emulsifying with a stirrer-type emulsifying apparatus and then passing the emulsified product through a high pressure homogenizer. It is also preferable that after emulsifying/dispersing in such an emulsifying apparatus, additives such as a wetting agent and a surfactant are added and then the obtained ink is further passed through a high pressure homogenizer before packing into an ink cartridge.

In case of containing a low-boiling organic solvent in addition to a high-boiling organic solvent, it is favorable to remove the low-boiling solvent from the viewpoints of the stability of the emulsion and safety and hygiene. The low-boiling organic solvent can be removed by using various publicly known methods such as evaporation, vacuum evaporation or ultrafiltration. It is favorable to carry out this procedure of removing the low-boiling organic solvent as immediately as possible after the emulsification.

The ink composition obtained in the present invention may contain appropriately selected additives such as a drying inhibitor for preventing plugging at ink jet nozzles due to dryness, a penetration accelerator for more smooth penetration of the ink into paper, an UV absorber, an antioxidant, a viscosity controlling agent, a surface tension controlling agent, a dispersing aid, a dispersion stabilizer, a mildew-proofing agent, a rust preventive, a pH adjustor, a defoaming agent and a chelating agent each in an appropriate amount.

As the drying inhibitor to be used in the present invention, it is preferable to select a water-soluble organic solvent having a vapor pressure lower than water. Specific examples thereof include polyhydric alcohols typified by ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerol and trimethylolpropane; lower alkyl ethers of polyhydric alcohols such as ethylene glycol monomethyl (or ethyl) ether, diethylene glycol monomethyl (or ethyl) ether and triethylene glycol monoethyl (or butyl) ether; heterocyclic compounds such as 2-pyrrolidone, N-methyl-2-pyrrolidone, 1,3-dimethyl-2-imidazolidinone and N-ethylmorpholine; sulfur-containing compounds such as sulfolane, dimethyl sulfoxide and 3-sulfolene; polyfunctional compounds such as diacetone alcohol and diethanolamine; and urea derivatives. Among these compounds, polyhydric alcohols such as glycerol and diethylene glycol are preferable therefor. Either one of these drying inhibitors or two or more thereof may be used. It is preferable that such a drying inhibitor is contained in an amount of from 10 to 50% by weight in the ink.

As the penetration accelerator to be used in the present invention, use can be made of alcohols such as ethanol, isopropanol, butanol, di (tri) ethylene glycol monobutyl ether and 1,2-hexanediol, sodium lauryl sulfate, sodium oleate and nonionic surfactants. Since such a penetration accelerator exerts a sufficient effect at a content of 10 to 30% by weight in the ink, it is preferably used in such an extent as not causing bleeding in printing or print-through.

As the UV absorber to be used in the present invention to improve the storage stability of images, use can be made of benzotriazole-type compounds described in Japanese Patent Laid-Open No. 185677/1983, ibid. No. 190537/1986, ibid. No. 782/1990, ibid. No. 197075/1993, ibid. No. 34057/1997, etc.; benzophenone-type compounds described in Japanese Patent Laid-Open No. 2784/1971, ibid. No. 194483/1994, U.S. Pat. No. 3,214,463, etc.; cinammic acid-type compounds described in Japanese Patent Publication No. 30492/1973, ibid. No. 21141/1981, Japanese Patent Laid-Open No. 88106/1998, etc.; triazine-type compounds described in Japanese Patent Laid-Open No. 298503/1992, ibid. No. 53427/1996, ibid. No. 239368/1996, ibid. No. 182621/1998, International Patent Publication No. 501291/1996, etc.; and compounds which absorb UV light and emit fluorescence (i.e., so-called fluorescent brighteners) typified by compounds described in Research Disclosure No. 24239 and stilbene- and benzoxazole-type compounds.

As the antioxidant to be used in the present invention for improving storage stability of images, use can be made of various organic and metal complex-based fading inhibitors. Examples of organic fading-inhibitors include hydroquinones, alkoxyphenols, dialkoxyphenols, phenols, anilines, amines, indans, chromans, alkoxyanilines and heterocyclic compounds, while examples of the metal complexes include nickel complexes and zinc complexes. More specifically, use can be made of compounds cited in Research Disclosure No. 17643, VII, I to J, ibid. No. 15162, ibid. No. 18716, p. 650, left column, ibid. No. 36544, p. 527, ibid. No. 307105, p. 872 and ibid. No. 15162 and compounds included in the general formula of typical compounds and examples of compounds described in Japanese Patent Laid-Open No. 215272/1987, pp. 127 to 137.

Examples of the mildew-proofing agent to be used in the present invention include sodium dehydroacetate, sodium benzoate, sodium pyridinethione-1-oxide, p-hyrdoxybenzoic acid ethyl ester, 1,2-benzisothiazolin-3- one and salts thereof. It is preferable that such a mildew-proofing agent is used in an amount of 0.02 to 5.00% by weight in the ink.

These compounds are described in detail in "Bokin Bobizai Jiten" (ed. by Nihon Bokin Bobi Gakkai Jiten Henshu Iinkai), etc.

Examples of the rust preventive include acidic sulfites, sodium thiosulfate, ammon thioglycolate, diisopropylammonium nitrite, pentaerythritol tetranitrate, dicyclohexylammonium nitrite and benzotriazole. It is preferable to use such a rust preventive in an amount of 0.02 to 5.00% by weight in the ink.

In the present invention, it is preferable to use a pH adjustor from the viewpoints of adjusting the pH value, imparting dispersion stability and so on. It is preferable to add the pH adjustor to give a pH value of 4.5 to 10.0, still preferably 6 to 10.0.

Examples of the pH adjustor include basic ones such as organic bases and inorganic alkalis and acidic ones such as organic acids and inorganic acids.

Examples of the above-described organic bases include triethanolamine, diethanolamine, N-methyldiethanolamine and dimethylethanolamine. Examples of the above-described inorganic alkalis include alkali metal hydroxides (for example, sodium hydroxide, lithium hydroxide, potassium hydroxide), carbonic acid salts (for example, sodium carbonate, sodium hydrogencarbonate) and ammonia.

Examples of the above-described organic acids include acetic acid, propionic acid, trifluoroacetic acid and alkylsulfonic acids. Examples of the above-described inorganic acids include hydrochloric acid, sulfuric acid and phosphoric acid.

Separately from the surfactants as described above, nonionic, cationic or anionic surfactants may be used in the present invention as a surface tension controlling agent. Examples of the anionic surfactant include fatty acid salts, alkyl sulfates, alkyl benzenesulfonates, alkyl naphthalenesulfonates, dialkyl sulcosuccinates, alkyl phosphates, napthalenesulfonic acid-formalin condensate and polyoxyethylene alkyl sulfates. Examples of the nonionic surfactant include polyoxyethylene alkyl ethers, polyoxyethylene alkyl allyl ethers, polyoxyethylene fatty acid esters, sorbitan fatty acid esters, polyoxyethylene sorbitan fatty acid esters, polyoxyethylene alkylamines, glycerol fatty acid esters and oxyethylene-oxypropylene block copolymer. Also, SURFYNOLS (manufactured by Air Products & Chemicals) which are acetylene-based polyoxyethylene oxide surfactants can be preferably employed. It is also preferable to use amphoteric surfactants such as N,N-dimethyl-N-alkylamine oxides. Furthermore, use can be made of surfactants cited in Japanese Patent Laid-Open No. 157,636/1984, pp. (37) to (38) and Research Disclosure No. 308119 (1989).

It is preferable that the ink according to the present invention has a surface tension of from 20 to 60 mN/m, still preferably form 25 to 45 mN/m, with or without the use of these agents.

It is preferable that the ink to be used in the present invention has a viscosity of 30 mPa·s or less. It is still preferable that the viscosity is controlled to 20 mPa·s or less. To control the viscosity, a viscosity controlling agent is used in some cases. Examples of the viscosity controlling agent include water-soluble polymers such as celluloses and nonionic surfactants. More specifically, these agents are described in "Nendo Chosei Gijutsu" (Gijutsu Joho Kyokai, 1999), Chap. 9 and "Inku Jetto Purinta-yo Kemikaruzu (rev. 98)—Zairyo no Kaihatsu Doko Tenbo Chosa—" (CMC, 1997), pp. 162 to 174.

In the present invention, it is also possible to use above-described cationic, anionic and nonionic surfactants as a dispersion stabilizer, fluorine- and silicone-based compounds as a defoaming agent, and a chelating agent typified by EDTA, if needed.

Next, recording papers and recording films to be used in the image recording method according to the present invention will be described. As the substrate of the recording papers and the recording films, use can be made of substrates which are produced by using a chemical pulp such as LBKP or NBKP, a mechanical pulp such as GP, PGW, RMP, TMP, CTMP, CMP and CGP, a recycled fiber such as DIP, etc., adding, if necessary, various publicly known additives such as a pigment, a binder, a sizing agent, a fixation agent, a cationic agent and a paper strengthening agent, and treating the mixture with various apparatuses such as a long net paper machine or a circular net paper machine. In addition to such substrates, use can be also made of synthetic paper or plastic film sheets. It is desirable that the substrate has a thickness of from 10 to 250 μm and a basis weight of from 10 to 250 g/m².

An image recording layer and a back coat layer may be directly formed on the substrate to give an image recording material. Alternatively, a size press or an anchor coat layer may be formed by using starch, polyvinyl alcohol, etc. followed by the formation of the image recording layer and the back coat layer to give an image recording material. Moreover, the surface of the substrate may be flattened by using a calendering apparatus such as a machine calender, a TG calender or a soft calender.

As the substrate in the present invention, it is still preferable to use papers and plastic films coated on both faces with a polyolefin (for example, polyethylene, polystyrene, polyethylene terephthalate and copolymers thereof). It is favorable that the polyolefin contains a white pigment (for example, titanium oxide, zinc oxide) or a tinting dye (for example, cobalt blue, ultramarine, neodymium oxide).

The image recording layer formed on the substrate contains a porous material and an aqueous binder. It is preferable that the image recording layer contains a pigment. It is preferable to use an inorganic pigment, still preferable a white pigment. Examples of the white pigment include inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate; and organic pigments such as styrene-based pigments, acrylic pigments, urea resins and melamine resins. It is preferable to use a porous inorganic pigment, still preferably synthetic amorphous silica etc. having a large pore area. As the synthetic amorphous silica, either silicic anhydride obtained by dry method or water-containing silicic acid obtained by the wet method can be used. It is particularly desirable to use water-containing silicic acid. Two or more of these pigments may be used combinedly.

Examples of the aqueous binder contained in the image recording layer include water-soluble polymers such as polyvinyl alcohol, silanol-denatured polyvinyl alcohol, starch, cationized starch, casein, gelatin, carboxymethylcellulose, hydroxyethylcellulose, polyvinylpyrrolidone, polyalkylene oxides and polyalkylene oxide derivatives; and water-dispersible polymers such as stryene butadiene latex and acrylic emulsion. Either one of these aqueous binders or a mixture of two or more thereof may be used. Among all, it is particularly adequate in the present invention to use polyvinyl alcohol or silanol-denatured polyvinyl alcohol from the viewpoint of the adhesiveness to a pigment and peeling resistance of the image recording layer.

In addition to the pigment and the aqueous binder, the image recording layer may contain additives such as a mordant, a water-proofing agent, a light-fastness improving agent, a surfactant and a film hardener.

It is preferable that the mordant to be added to the image recording layer has been immobilized. From this viewpoint, it is preferable to use a polymer mordant.

Polymer mordants are described in Japanese Patent Laid-Open No. 28325/1973, ibid. No. 74430/1979, ibid. No. 124726/1979, ibid. No. 22766/1980, ibid. No. 142339/1980, ibid. No. 23859/1985, ibid. No. 23851/1985, ibid. No. 23852/1985, ibid. No. 23853/1985, ibid. No. 57836/1985, ibid. No. 60643/1985, ibid. No. 118834/1985, ibid. No. 122940/1985, ibid. No. 122941/1985, ibid. No. 122942/1985, ibid. No. 235134/1985, ibid. No. 161236/1989, U.S. Pat. No. 2,484,430, ibid. U.S. Pat. No. 2,548,564, ibid. U.S. Pat. No. 3,148,061, ibid. U.S. Pat. No. 3,309,690, ibid. U.S. Pat. No. 4,115,124, ibid. U.S. Pat. No. 4,124,386, ibid. U.S. Pat. No. 4,193,800, ibid. U.S. Pat. No. 4,273,853, ibid. U.S. Pat. No. 4,282,305 and ibid. U.S. Pat. No. 4,450,224. In particular, image recording layers containing the polymer mordants described in Japanese Patent Laid-Open N. 161236/1989, pp. 211 to 215. Use of the polymer mordants described in this document makes it possible to obtain images having excellent qualities and improved light-fastness.

The water-proofing agent is effective in making images water-proof. As the water-proofing agent, it is particularly desirable to use a cationic resin. Examples of such a cationic resin include polyamide-polyamine epichlorhydrin, polyethyleneimine, polyamine sulfone, dimethyldiallylammonium chloride polymers, cationic polyacrylamide and colloidal silica. Among these cationic resins, polyamide-polyamine epichlorhydrin is particularly preferable. It is preferable that such a cationic resin is contained in an amount of from 1 to 15% by weight, still preferably from 3 to 10% by weight, based on the total solid matters in the ink receptor layer.

Examples of the light-fastness improving agent include zinc sulfate, zinc oxide, hindered amine-type antioxidants and benzophenone-type or benzotriazole-type UV absorbers. Among all, zinc oxide is appropriate therefor.

The surfactant serves as an application aid, a peeling properties improving agent, a slipperiness improving agent or an antistatic agent. Surfactants are described in Japanese Patent Laid-Open No. 173463/1987 and ibid. No. 183457/1987.

As a substitute for the surfactant, use may be made of an organic fluoro compound. It is preferable that this organic fluoro compound is a hydrophobic compound. Examples of the organic fluoro compound include fluorine-based surfactants, oily fluorine compounds (for example, fluorine oil) and solid fluorine compounds (for example, tetrafluoroethylene resin). Organic fluoro compounds are described in Japanese Patent Publication No. 9053/1982 (columns 8 to 17), Japanese Patent Laid-Open No. 20994/1986 and ibid. No. 135826/1987.

As the film hardener, use can be made of materials described in Japanese Patent Laid-Open No. 161236/1989, etc.

As other additives to be added to the image recording layer, a pigment dispersing agent, a thickener, a defoaming agent, a dye, a fluorescent brightener, a preservative, a pH adjustor, a matting agent, a film hardener, etc. can be cited. Either one or two image recording layers may be formed.

The recording papers and recording films can be further provided with a back coat layer which may contain a white pigment, an aqueous binder and the like.

Examples of the white pigment contained in the back coat layer include inorganic white pigments such as light calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudonboehmite, aluminum hydroxide, alumina, lithopone, zeolite, water-containing halloysite, magnesium carbonate and magnesium hydroxide; and organic pigments such as styrene-based plastic pigments, acrylic plastic pigments, polyethylene, microcapsules, urea resins and melamine resins.

Examples of the aqueous binder contained in the back coat layer include water-soluble polymers such as styrene/maleate copolymers, styrene/acrylate copolymers, polyvinyl alcohol, silanol-denatured polyvinyl alcohol, starch, cationized starch, casein, gelatin, carboxymethylcellulose, hydroxyethylcellulose and polyvinylpyrrolidone; and water-dispersible polymers such as styrene butadiene latex and acrylic emulsion. Other additives contained in the back coat layer include a defoaming agent, a foaming inhibitor, a dye, a fluorescent brightener, a preservative and a water-proofing agent.

The layers constituting ink jet recording papers and recoding films (including back layer) may further contain a dispersion of polymer microparticles. The dispersion of polymer microparticles is used in order to improve the film properties such as dimensional stability, anti-curling properties, anti-adhesion properties, and anti-cracking properties. Dispersions of polymer microparticles are described in Japanese Patent Laid-Open No. 245258/1987, ibid. No. 136648/1987 and ibid. No. 110066/1987. By adding a dispersion of polymer microparticles having a low glass transition temperature (40° C. or below) to a layer containing a mordant, the layer can be prevented from cracking and curling. Also, the back layer can be prevented from curling by adding a dispersion of polymer microparticles having a high glass transition temperature.

In the present invention, the ink jet recording system is not particularly restricted. Therefore, the present invention is applicable to publicly known systems such as the charge-controlling system of jetting an ink by using electrostatic attraction, the drop-on-demand system (pressure pulse system) by using the vibration pressure of a piezoelectric device, the acoustic ink jet system of converting electric signals into acoustic beams and irradiating an ink therewith to jet the ink due to the radiation pressure, the thermal ink jet (bubble jet) system of bubbling an ink by heating and using the thus generated pressure, etc.

The ink jet systems include a system wherein a great number of small-volume drops of an ink having a low density (i.e., a photoink) are jetted, a system wherein a plural number of inks having substantially the same color hue but different densities are used for improving image qualities, and a system wherein a colorless and transparent ink is used.

EXAMPLES

The present invention will be described by reference to the following Example. However, it is to be understood that the present invention is not construed as being restricted thereto.

Ink 101

Deionized water was added to the following components to thereby adjust the total volume to 1 l. Then the resulting mixture was stirred for 1 hour under heating to 30 to 40° C. Next, the mixture was adjusted to pH 9 with 10 mol/l KOH and filtered under reduced pressure through a microfilter having an average pore size of 0.25 m to thereby give an ink solution for magenta (Ink 101).

Ink Composition

| | |
|---|---|
| Magenta colorant M-1 | 7.5 g/l |
| diethylene glycol | 150 g/l |
| urea | 37 g/l |
| glycerol | 130 g/l |
| triethylene glycol monobutyl ether | 130 g/l |
| triethanolamine | 6.9 g/l |
| benzotriazole | 0.08 g/l |
| PROXEL XL2 | 3.5 g/l |
| Surfactant (Aerosol OT) | |

40 g/l of γ-cyclodextrin was added to the Ink 101 obtained above to give Ink 102. Also, γ-cyclodextrin and a molecular nanotube (prepared in accordance with the method described in J. Phys. Chem. (1996), 100(38), 15562–15568) were added each at a concentration of 40 g/l to Ink 101 to give Ink Set 103.

Magenta Colorant M-1:

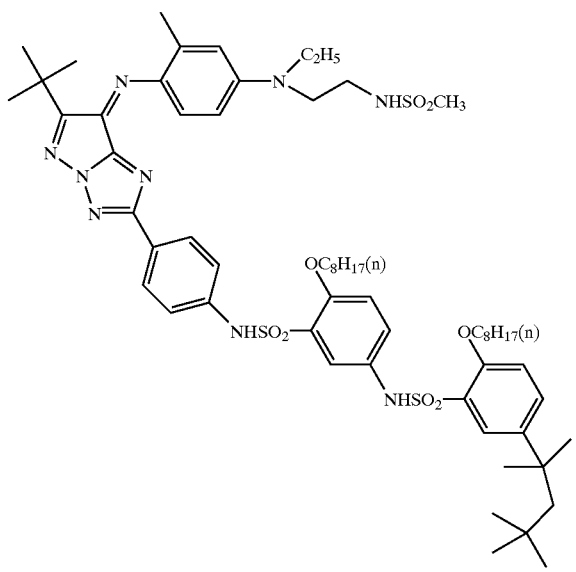

These ink sets 101 to 103 were packed in cartridges of an ink jet printer Model PM670C (manufactured by EPSON). Then images were printed on an ink jet recording paper (Photo Kotakushi EX; manufactured by Fuji Photo Film Co., Ltd.) and the color image storage stability was evaluated.

The evaluation of the image storage stability was performed in the following manner by forming a magenta solid image print sample.

(1) Light-fastness was evaluated by measuring the image density Ci immediately after printing with X-rite 310. Then the image was irradiated with a xenon light (85000 1×) for 10 days by using a weather meter manufactured by Atlas. Then the image density Cf was measured again and the dye residual ratio (Cf/Ci) was determined, thereby evaluating the light-fastness.

(2) Heat-fastness was evaluated by measuring the density of a sample with X-rite 310 before and after storing at 80° C. under 15% RH for 10 days and thus determining the dye residual ratio. Table 1 shows the obtained results.

TABLE 1

| Ink set No. | Light irradiation test Dye residual ratio (%) | Heat storage test Dye residual ratio (%) |
|---|---|---|
| 101 (Comparison) | 23 | 42 |
| 102 (Comparison) | 32 | 53 |
| 103 (Invention) | 73 | 89 |

The results given in Table 1 indicate that the ink in which the compound capable of including a dye therein is used showed largely improved fastness to light and heat.

This application is based on Japanese Patent application JP2001-266015, filed Sep. 3, 2001, the entire content of which is hereby incorporated by reference, the same as if set forth at length.

What is claimed is:

1. An ink composition comprising water, a dye and at least one compound capable of including a dye therein, wherein the dye is dissolved or dispersed in an aqueous medium comprising the water, and wherein the compound is a rotaxane molecule or a molecular nanotube.

2. An ink composition according to claim 1, further comprising a water-miscible organic solvent, wherein the dye is dissolved or dispersed in an aqueous medium comprising the water and the water-miscible organic solvent.

3. The ink composition according to claim 1, wherein the compound has a constitutional unit comprising cyclodextrin.

4. The ink composition according to claim 1, wherein the ink composition is used in ink jet recording.

5. The ink composition according to claim 2, wherein the ink composition is used in ink jet recording.

6. The ink composition according to claim 3, wherein the ink composition is used in ink jet recording.

7. The ink composition according to claim 1, which comprises 0.1 to 60% by weight of the at least one compound.

8. The ink composition according to claim 1, wherein the dye is an oil soluble dye, and the ink composition is produced by a process comprising the steps of:
   dissolving the dye in a high-boiling-point organic solvent; and
   dispersing the organic solvent in the aqueous medium after the dissolving.

9. An ink jet recording method comprising:
   preparing an image recording material which comprises a support and image recording layer comprising inorganic pigment particles; and
   ejecting the ink composition according to claim 1 to the image recording material according to a recording signal.

10. An ink jet recording method comprising:
    preparing an image recording material which comprises a support and image recording layer comprising inorganic pigment particles; and
    ejecting the ink composition according to claim 2 to the image recording material according to a recording signal.

11. An ink jet recording method comprising:
    preparing an image recording material which comprises a support and image recording layer comprising inorganic pigment particles; and
    ejecting the ink composition according to claim 4 to the image recording material according to a recording signal.

* * * * *